E. MEITNER.
TESTING STAND FOR GYROSCOPES.
APPLICATION FILED OCT. 6, 1915.
1,374,162.
Patented Apr. 5, 1921.
4 SHEETS—SHEET 1.
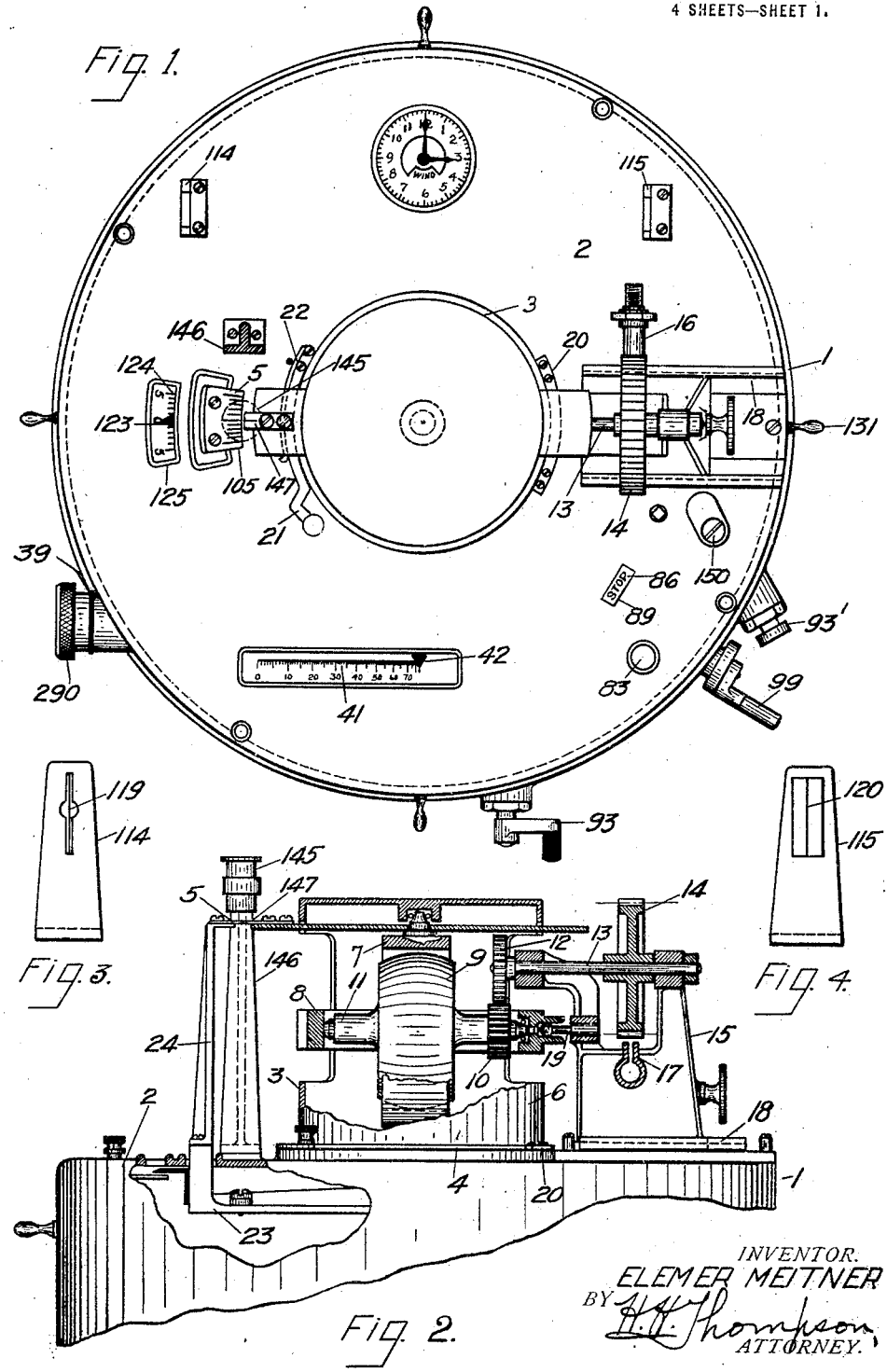

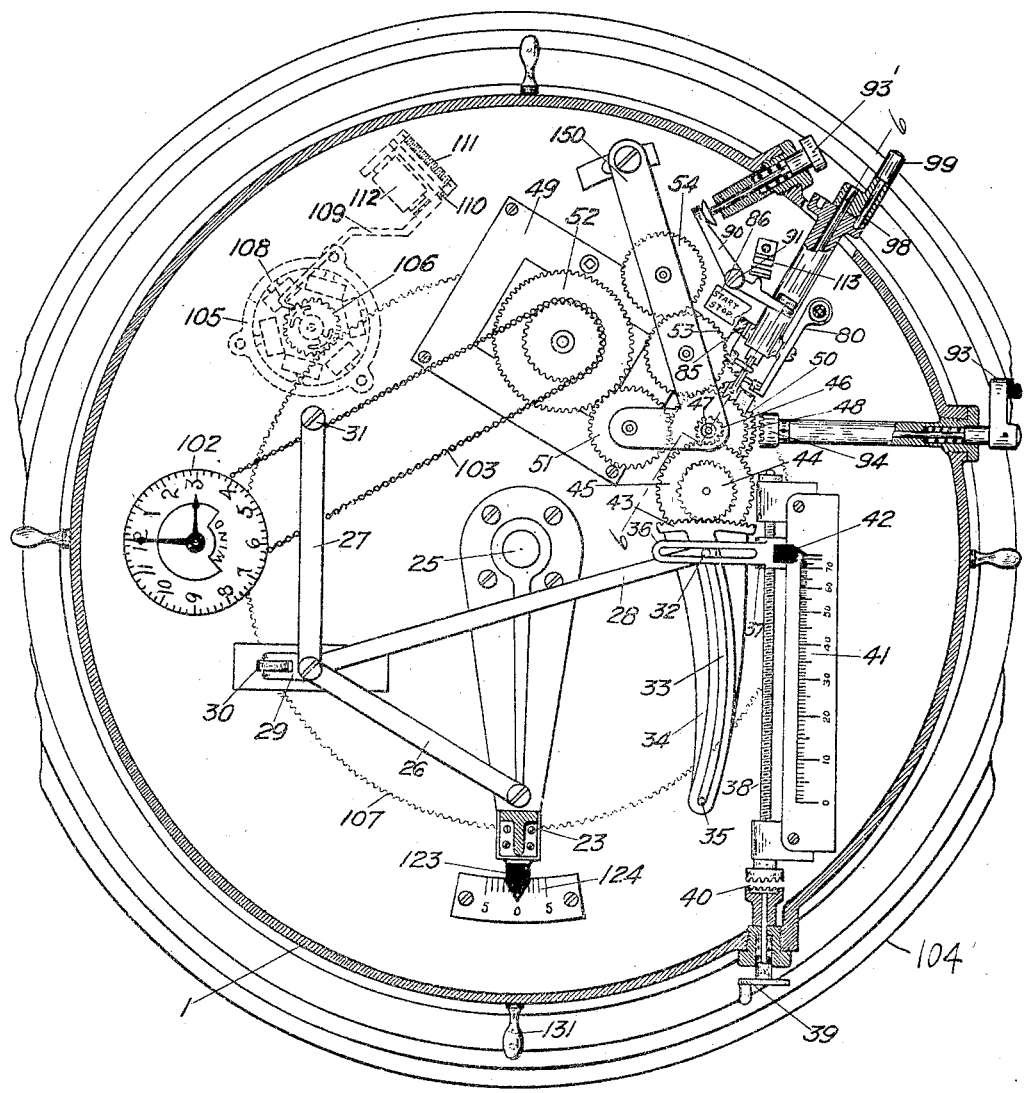

E. MEITNER.
TESTING STAND FOR GYROSCOPES.
APPLICATION FILED OCT. 6, 1915.
1,374,162.
Patented Apr. 5, 1921.
4 SHEETS—SHEET 3.
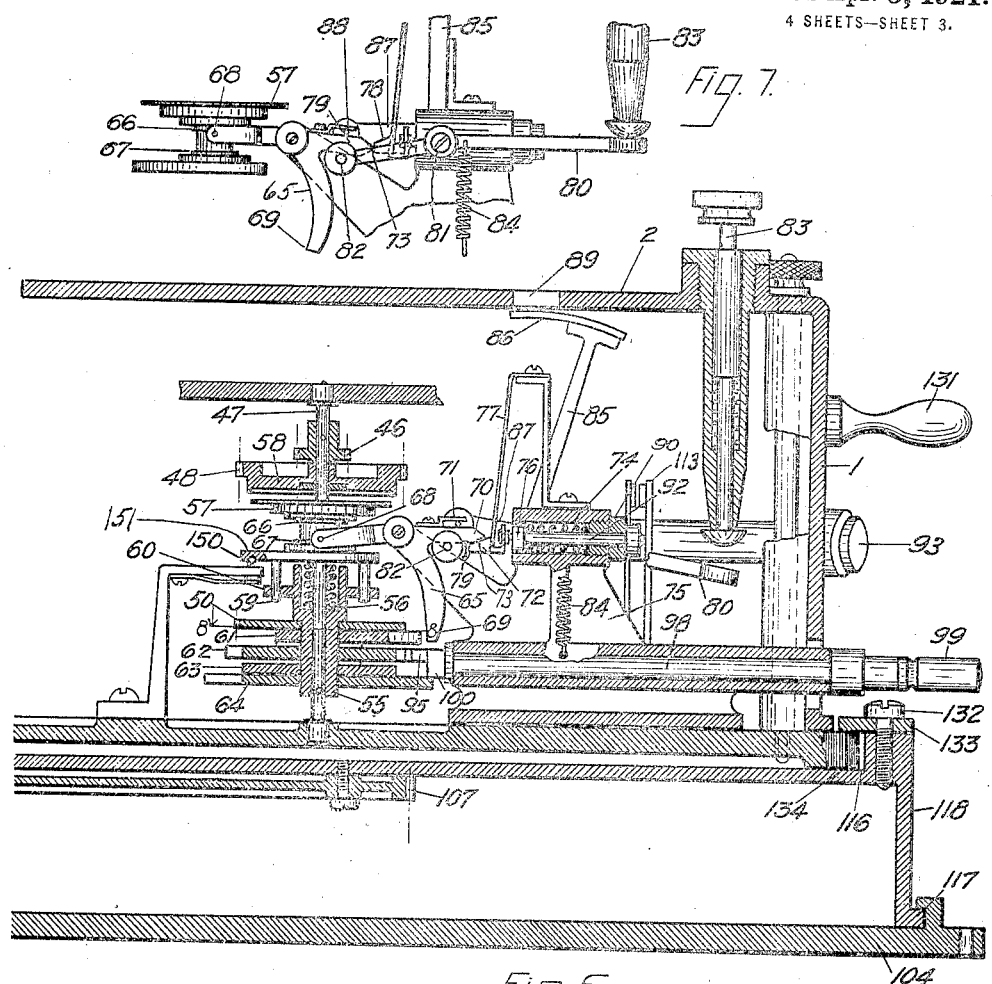

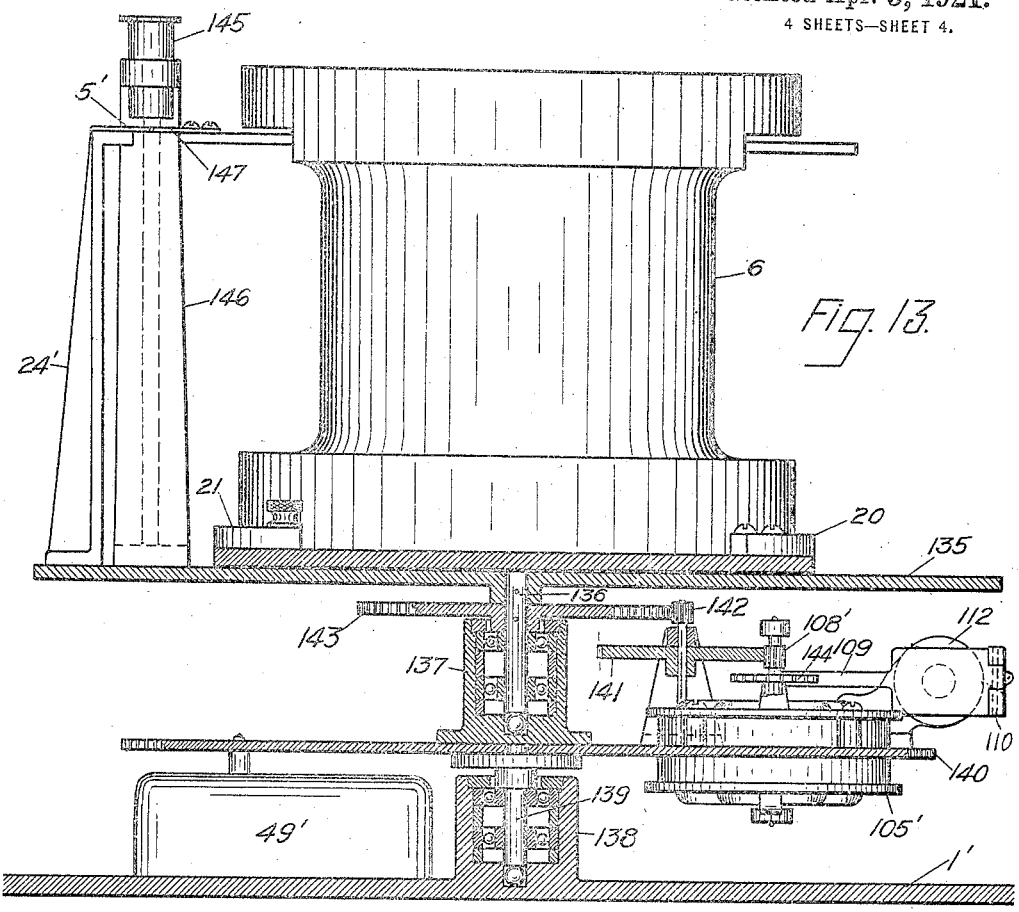
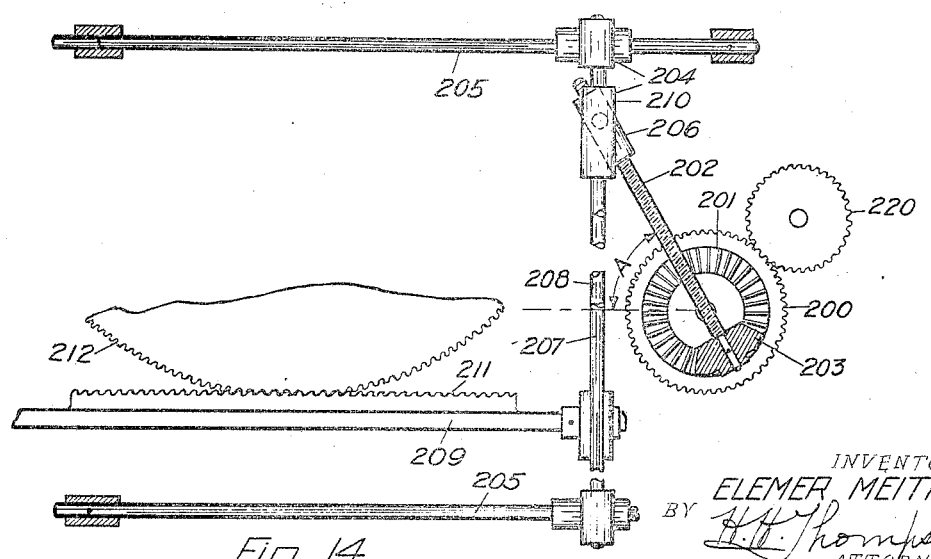

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

TESTING-STAND FOR GYROSCOPES.

1,374,162.　　　　Specification of Letters Patent.　　Patented Apr. 5, 1921.

Application filed October 6, 1915. Serial No. 54,319.

*To all whom it may concern:*

Be it known that I, Dr. ELEMER MEITNER, a subject of the King of Hungary, residing at Brooklyn, county of Kings, State of New York, have invented certain new and useful Improvements in Testing-Stands for Gyroscopes, of which the following is a specification.

This invention relates to an apparatus for testing the balance and accuracy of gyroscopes. Heretofore, so far as I am aware, no practical method has ever been devised for accurately testing the balance of a gyroscope designed for three degrees of freedom under operating conditions.

As gyroscopes with the above characteristics are now being employed for the steering of torpedoes, it has become quite important that means be provided whereby their accuracy may be tested immediately prior to launching, so that the officer in charge will know to a certainty exactly what the behavior of the gyroscope will be during the run.

The object of my invention is to construct a testing apparatus which may be used in any latitude, on either land or shipboard and which, although necessarily a delicate instrument, is substantially foolproof.

In order that the underlying principle of my invention may be more easily comprehended, I will first state the law which governs the behavior of a gyroscope with three degrees of freedom. Such a gyroscope will of course be carried around with the earth as the earth rotates, but will be otherwise unaffected thereby. That is, the spinning axis of the gyroscope will move parallel to itself in space about the axis of the earth. It results from this law that the gyroscope will have an apparent movement with reference to the surface of the earth, which will vary according to the initial inclination and direction of the axis and the latitude in which the gyroscope is placed. Thus, with the spinning axis horizontal in the east-west plane the axis would turn over in a vertical circle every twenty-four hours, if the gyroscope were on the equator, while if it were at one of the poles it would describe a horizontal circle in a like period. With reference to intermediate latitudes, the curve described is inclined, having both a horizontal and vertical component, but the character and equation of each can be accurately determined for every latitude. If, however, the gyroscope is ever so slightly out of balance about any axis, the entire character of the curve is immediately altered. It is upon this feature that my invention is based.

I propose to construct an instrument which will move in accordance with the theoretical movement of a perfect gyroscope, or preferably according to the horizontal or vertical component thereof, and to test the gyroscope thereby. By employing but one component of the movement, preferably the horizontal, the construction of the apparatus may be made very simple.

Referring to the drawings in which what I now consider to be the preferred forms of my invention are shown:

Figure 1 is a plan view of one form of gyro testing stand.

Fig. 2 is an elevation partly in section of the same.

Figs. 3 and 4 are details of the sights employed on said instrument.

Fig. 5 is a plan view of the interior mechanism of the testing stand, the cover being shown as cut away.

Fig. 6 is an enlarged sectional elevation of the automatic throw-out clutch and stop mechanism.

Fig. 7 is a detail of a portion of the same mechanism, illustrating a different position of the parts.

Fig. 8 is a section on line 8—8 of Fig. 6.

Figs. 9, 10 and 11 are plan views of the plates that form the stop mechanism shown in Fig. 8.

Fig. 12 is an end view of the reversible stop pin.

Fig. 13 is a vertical section of a modified form of gyro testing stand.

Fig. 14 is a diagrammatic view of another modification.

Fig. 15 is a small wiring diagram of the electrical portions of the apparatus.

Fig. 16 is a detail.

The testing stand is shown as inclosed in a cylindrical casing 1 having a cover plate 2. The gyroscope 3 to be tested is placed upon platform 4. The relatively movable member by which the movements of the gyroscope are observed is shown at 5. Graduations 105 are provided thereon. It is readily apparent that either the platform 4 or member 5 or both may be made movable, so long as their relative movement is properly governed. I prefer to impart this motion to member 5 for reasons that will become apparent as the description proceeds.

The gyroscope is shown as a standard torpedo gyroscope designed to be initially spun up and allowed to drift during the run of the torpedo. It comprises a casing 6, vertical gimbal ring 7, horizontal gimbal ring 8 and rotor 9 journaled therein. A gear 10 is mounted on the shaft 11 of the rotor, so that the gyro may be started through gear 12 on the shaft 13 of impulse wheel 14. Said shaft is journaled in a movable bracket 15, which carries a compressed air pipe 16 and nozzle 17 for driving the wheel 14. Bracket 15 is slidable in guideways 18 to and from the gyroscope so that gears 10 and 12 may be disengaged after the gyro is spun up. Locking means 19 are provided to hold the ring 8 stationary during the starting operation. A lock is preferably provided on base 4 to hold the gyroscope in place. This may comprise a fixed stop 20 and a spring pressed latch 21, pivoted at 22.

Referring now to Fig. 5, in which the main portion of the mechanism of my invention is shown, the part to which movable member 5 is secured is shown broken away at 23, scale 5 being mounted on an upstanding bracket 24 (Fig. 2) projecting through top 2. Part 23 preferably assumes the form of an arm pivoted on a central hub 25. An index 123 may be provided on said arm to show its apparent movement with respect to the earth. A fixed scale 124 coöperates therewith, which is visible through an aperture 125 in top 2. It is graduated in both directions from 0, since the index moves in opposite directions in the northern and southern hemispheres. A system of levers is connected with arm 23 which is designed to impart the required motion thereto. This system comprises in the present instance a link 26 pivoted to member 23 and to a pair of links 27 and 28. A small carriage 29 and roller 30 may be provided to support their junction point. Lever 27 is pivoted to the casing at 31, while lever 28 is provided with a pin 32 adjacent one end which works in a curved slot 33 in arm 34 pivoted at 35. The position of pin 32 in the slot is governed by a slotted member 36 taking over the pin, a portion of which is made in the form of nut 37 threaded on rotatable shaft 38. A handle 39 is provided to rotate the shaft, a clutch 40 being interposed therebetween. In Fig. 1 a detachable cap 290 is shown as covering handle 39. Member 36 is designed to be set according to the latitude at which the machine is being used. An indicating means is provided to aid in setting the member, which comprises a specially graduated fixed scale 41 and an index 42 on nut 37. The graduations are laid out as functions of the sine of the latitude, the index being shown at 90° or at the north or south pole.

Arm 34 is provided with teeth 43 with which a gear 44 meshes. A second gear 45 secured to gear 44 is driven from a pinion 46 pinned to shaft 47 (Fig. 6).

Clock work or other constant speed mechanism inclosed in case 49 is used to actuate the gears just described, but for the purpose of avoiding injury to the sensitive portions of the machine, I prefer to interpose an automatic throw-out clutch between the clock work and the element 23. In the arrangement shown the clock work operates continuously a gear 48 which is loosely mounted on shaft 47 through gears 51 and 52, or through reversing gears 53, 54 and 52, all of gears 51, 52 and 54 being mounted on a pivoted arm 150 adapted to be moved so as to bring either gear 51 or gear 54 into mesh with gear 52, whereby the movement imparted to arm 23 is reversed, so as to adapt the instrument for use in either hemisphere. The lower surface 58 of gear 48 is made in the form of a clutch face which is designed to coöperate with a movable clutch member 57 slidably but non-rotatably mounted on shaft 47. A sleeve 55 pinned to shaft 47 serves to connect member 57 with the shaft as by means of pins 59 which slidably engage holes in a collar 60 on sleeve 55. A coil spring 56 is positioned in an enlarged bore in the upper end of sleeve 55 for closing the clutch. Also mounted on sleeve 55 are a cam 61, a pair of stop disks 62 and 63, a gear 50 and a disk 64. Cam 61 is adapted to operate the mechanism for controlling clutch 57, which includes a bell crank lever 65 against the lower end 69 of which cam 61 is adapted to press. Said lever is forked and carries pins 68 adjacent its other end which operate between spaced flanges 66, 67 on clutch 57. Said lever is also provided with a rearwardly extending arm 70 which carries fork 71. A spring pressed cam block 72 is provided adjacent the wedge shaped end 73 of arm 70 for the purpose of throwing the clutch upon the initial movement of lever 65 by cam 61. Block 72 is provided with an inclined surface 78 (Fig. 16) which coöperates with beveled surface 73 on trigger 70 to throw out the clutch and an almost vertical face 79, against which the knife-like end of trigger 70 is adapted to bear when the clutch is in. Face 79 is given a slight inclination to compensate for the friction between it and the end of the trigger, so that a very slight pressure on end 69 of lever 65 by the cam will serve to release spring block 72. The purpose of this mechanism is to relieve the clock mechanism of the actual work in operating the throw-out clutch against the action of heavy spring 56. The clock work is necessarily delicate and comparatively weak, so that, if a sudden load were thrown on it, it would probably stop or be strained. As a further aid to this end, flanges 66 and 67 are spaced a sufficient distance apart so that pins 68 meet with no resistance upon their initial movement away from the position shown in Fig. 7, that is when lever 65 is being moved by cam 61, so that the entire work of throwing the clutch falls on the strong spring 74 which operates block 72. Said spring 74 is located within an aperture in a bracket 75 and serves to press a plunger 76 outwardly into contact with the leaf spring 77 which carries block 72.

Manual means are provided for tripping the clutch at will. A lever 80, pivoted on bracket 75 at 81 carries adjacent one end a pin 82 adapted to engage the trigger 70. A spring pressed push button 83 is mounted above the other end so that one need only press upon it to throw out the clutch. An indicator to show the condition of the apparatus is shown at 86. It is mounted on an arm 85 pivoted to bracket 75 and provided with an extension 87 carrying a pin 88. Said pin rests on trigger 70 and is held in place by fork 71. Indicator 86 is visible through an aperture 89 in cover 2. A light spring 84 secured to lever 80 may be provided to counterbalance any excess weight of the inner end of levers 80 and 85.

Means are also provided to reset the clutch, after it has been tripped. Such means may consist of lever 90 (Fig. 5) pivoted at 91 and secured to the stem 92 (Fig. 6) of plunger 76. A push button 93' which bears against the other end of the lever 90 is used to operate it to retract block or catch 72 and allow spring 56 to close the clutch 57.

To bring index 123 back to zero on scale 124 after a run, a spring pressed handle 93 (Fig. 5) is provided, which rotates a crown gear 94. By pushing in on the handle, the gear is brought into mesh with gear 50 so that the index may be reset by rotating the handle.

The function of disks 62 and 63 is to prevent the linkage 23, 26, 27 and 28 from being moved beyond its limit of movement and also to aid in bringing index 123 back to zero. A stop pin 95 is arranged to strike against projection 96 on disk 62 when index 123 reaches the zero position, and to strike lug 97 when the limit of movement is reached, which in this instance is 5°. Pin 95 is eccentrically mounted on a rotatable rod 98 provided with a handle 99. When the stop is in the position shown in Figs. 6 and 12, it coöperates with member 62, but when rod 98 is turned over, it will coöperate with lugs 96', 97' on member 63. In the position shown, the pin is set for northern latitudes while if the machine is transferred south of the equator, all that need be done is to turn handle 99 over. It is important, however, that index 123 should be brought back to zero before handle 99 is turned over, since otherwise the proper phase relation of the automatic throw-out cam 61 with the arm 63 would be lost, thereby rendering said cam useless. For this purpose disk 64 is provided, which is positioned immediately under a squared portion 100 on rod 98, so as to prevent turning of said rod. A notch 101 is cut in that portion of disk 64 directly under or between stops 96 and 96', thereby permitting the setting of pin 95 only when index 123 is at zero. As an additional safeguard a spring pressed stop pin 150 is provided which is adapted to engage a notch in collar 151 on clutch member 57, when the index 123 reaches the zero position, or in other words at the same time that stop 96 (or 96') strikes pin 95. This pin performs the additional function of preventing movement of the clutch and linkage in either direction until clutch member is raised preparatory to throwing in the clutch.

The clock work 49 is shown as connected to a clock face 102 by a chain 103.

While the mechanism so far described would give satisfactory service on land, means should be provided to hold the stand fixed in azimuth, if it is to be adapted for use on shipboard. This may be done automatically by rotatably mounting the entire apparatus on a base 104, on which a repeater motor 105 driven from a transmitter 205 on a gyro-compass may be mounted. Said motor is shown as geared to the stand through pinion 106 on the motor shaft and large gear 107 on the stand. A lock 108 is provided for the motor to hold it from turning, when unexcited. Said lock is shown as comprising a latch 109 pivoted at 110, the locking end of which is normally drawn into engagement with the teeth of gear 106 or other notched surface by spring 111. Electro-magnet 112 is placed in the circuit of motor 105, so that when the motor is excited it withdraws the latch. I also provide means to prevent the operation of the repeater, except when the testing mechanism is running. This may comprise a switch 113 in circuit with said repeater and lock magnet which is normally open but is closed by the starting of the testing stand through button 93.

As an additional or alternative method of holding the stand fixed in azimuth, a pair of sights 114, 115 (Figs. 1, 3 and 4) may be provided on top 2. In addition, casing 1 may have a swivel mounting 116 besides the swivel on base 104 at 117 by interposing a member 118 between base 104 and casing 1, which member carries gear 107. In using the sights, the operator takes a sight on a distant object and keeps the cross hairs 119 and 120 alined on said object during the test by turning the casing by handles 131. If it is desired to prevent relative turning between casing 1 and member 118, set screws 132 may be tightened to clamp blocks 133 on flange 134.

Another form that my invention may assume is shown in Fig. 13. According to this modification, instead of mounting the gyroscope on a stationary part and observing its behavior with respect to a movable part, I mount the gyroscope on the moving part and observe it with respect to a fixed part. A portion, only, of this mechanism is shown, as it is in the main similar to that described above. The movable platform is shown at 135, on which clamps 20 and 21 are mounted for securing the gyroscope 6 in place. Platform 135 is secured to a central post 136 rotatably mounted in a hub 137. A boss 138 is provided in casing 1' for the reception of stem 139 of a large gear 140 which serves to support hub 137. Gear 140 has connected therewith the clock and clutch mechanism described with reference to the main form of the invention, the clock work being shown as inclosed in a box 49' while the other mechanism is omitted. Instead of turning the entire testing stand in azimuth to maintain it in the same position, I have shown another method of accomplishing the same result. This consists in preventing the turning of the ship from affecting only the moving element, which in this instance is platform 135. To accomplish this, the correction from the master compass is introduced by a differential connection so as not to disturb the effect of the movement imparted by the clock work. A simple form of differential connection is secured by mounting the repeater motor 105' on gear 140, so as to revolve therewith, and by gearing the motor through pinion 108', and idlers 141, 142 to a large gear 143 on pin 136. A separate toothed wheel 144 is shown for latch 109 in this view.

Post 24', carrying scale 5', is also mounted on the movable platform. A microscope 145 is shown in both forms of the invention mounted on a post 146 directly over scale 5 or 5' so as to observe the relative movement between said scale and a reference mark or pointer 147 secured to the vertical ring 7 of the gyroscope (Fig. 2).

As pointed out above, the function of curved arm 34, slide 36 and the linkage 23, 26, 27 and 28 is to produce a rotation of arm 23 which is proportional to the sine of the latitude. It is obvious that other means may be employed within the scope of this invention to effect the same purpose. Fig. 14 illustrates somewhat diagrammatically one other method. Gear 200 is driven in any suitable manner represented by gear 220 from clock work (not shown). It carries a bevel gear 201 over which a threaded shaft 202 is mounted. A second bevel gear 203 meshing with gear 201 is mounted on said shaft. A laterally movable carriage 204 is slidably mounted on guideways 205. Cross rods 207, 208 form the major portion of said carriage, a rack bar 209 being secured to the lower rod 208. A sleeve 210 is slidably mounted on rod 207 and has swiveled thereto a nut 206 in which shaft 202 is threaded. Rack 211 meshes with a gear 212 which is the sensitive movable element of this modification corresponding to arm 23 of the principal form. Shaft 202 is set at such angle A corresponding to the complement of the latitude of the instrument. It should be noted that in this form of my invention no reversing gear is needed for north and south latitude since the reversing is taken care of by the change speed mechanism.

The operation of the above described mechanism is briefly as follows:

Handle 99 and arm 150 are first placed in the proper positions depending upon whether the instrument is in north or south latitude, as explained above. Also index 42 is adjusted to indicate on scale 41 the exact latitude in which the machine is placed. After these preliminary adjustments, the gyroscope 6 is clamped upon the stand by clamps 20, 21, the spinning up mechanism on bracket 15 is pushed into engagement with the gyro wheel and the gyroscope brought up to speed thereby, after which the spinning up mechanism is withdrawn. The test proper may then be started by pushing in upon the starting handle 93', which will throw in clutch 57 so as to engage the gear 48 which, it will be remembered, is continuously rotated from clock work 49. Arm 23 carrying with it scale 5 will then be moved at the required rate or, more specifically, at the rate at which the gyroscope should move in azimuth with respect to the surface of the earth. The index 147 is carefully observed with respect to scale 5 through microscope 145 so that any relative movement therebetween may be at once detected. Index 123 may also be observed on scale 124, which will indicate the motion of arm 23. At or before the time arm 23 reaches the limit of its movement, cam 61 will strike bellcrank lever 65 and cause the clutch to be drawn out, thus stopping the movement of the linkage and arm. Before another test is started the index 123 should be brought back to zero by means of setting handle 93. If the test takes place on shipboard and for any reason repeater motor 105 should not be used, the operator should sight through sights 114 and 115 and hold the stand in a fixed position by grasping handles 131.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

The apparatus may be used for many other purposes than testing perfectly balanced gyroscopes. Thus an eccentric weight could be added to cause a desired rate of precession and the gyro tested in this condition by means of my invention. The rate of precession caused could be accurately measured by adjusting the speed of element 23 to equal the movement of gyroscope and then reading index 42 on scale 41. For this purpose the graduations on scale 41 could be modified to read in units of weight or according to some other suitable system. Other uses of my invention will suggest themselves to those skilled in the art.

Having described my invention, what I claim and desire to secure by Letters Patent is:

1. An apparatus for testing gyroscopes, comprising relatively movable members constant speed mechanism for causing relative movement of said members at a rate equal to the apparent movement in azimuth of a line moving with the earth but parallel to itself, a clutch in the connections between the movable member and said mechanism and means for automatically throwing out said clutch after said member has turned through a predetermined angle.

2. A gyro-testing apparatus comprising relatively movable members, a power driven mechanism, a latitude indicator and settable variable speed means connected with said indicator and connecting said mechanism with said members for imparting relative movement thereto at a rate proportional to a function of the indicated latitude.

3. An apparatus for testing gyroscopes comprising relatively movable members, a latitude scale, a variable speed drive for rotating one of said members, and means coöperating with said scale for setting said drive in accordance with the latitude.

4. A gyro-testing stand comprising a constant speed mechanism, a variable speed rotary platform adapted to be driven therefrom, and means for governing said platform comprising a reversing gear adapted to be set for north or south latitude and a variable speed mechanism driven from said constant speed mechanism connected to said platform and adapted to be set according to the degree of latitude.

5. A gyro-testing stand comprising a rotary platform adapted to receive a gyroscope, a constant speed driving device, a latitude scale, a change speed mechanism connecting said device and said platform, and means coöperating with said scale for setting said mechanism in accordance with the latitude.

6. In a testing apparatus, the combination with a movable member, of clock work for driving said member, a clutch interposed between said member and said clock work, a spring for holding said clutch normally closed and automatic means for opening said clutch after a predetermined interval of operation comprising a cam driven by said clock work, a device initially actuated by said cam, and means brought into action by said initial movement adapted to cause further movement of said device to open said clutch.

7. In a testing apparatus, the combination with a movable member, of clock work for driving said member, a clutch interposed between said member and said clock work, a spring for holding said clutch normally closed and automatic means for opening said clutch after a predetermined interval of operation comprising a cam, and means responsive to the movement of said cam for opening said clutch.

8. In a gyro-testing stand, a member adapted to be rotated in either direction, depending upon the latitude, means for so rotating said member and means for throwing out said rotating means after a predetermined rotation including a pair of stops on said means, and an adjustable stop pin adapted to be set so as to strike either one or the other of said stops depending upon their direction of rotation.

9. In a gyro-testing stand, mechanism adapted to be driven in either direction, depending upon the latitude, a pair of stops forming a part of said mechanism, an adjustable stop pin adapted to be set so as to strike either one or the other of said stops depending upon their direction of rotation, and means for preventing moving of said pin except when said mechanism is in a predetermined position.

10. In a gyro-testing stand, a member adapted to be rotated in either direction according to the latitude, means for so rotating said member, means for throwing out said rotating means after a predetermined rotation including a stop pin adapted in one position to confine the rotation of said platform to a predetermined limit in one direction and in another position to confine said rotation to a similar limit in the other direction and means whereby the position of said pin may be shifted.

11. In a testing apparatus for gyroscopes and the like, a rotatable member adapted to receive the gyroscope, a constant speed source of power and means for deriving a variable speed from said source, comprising a rotatable, constantly driven member having a slot, a driven element, a link adjustable in said slot and connected with said element and means whereby said link may be adjusted to any predetermined position.

12. An apparatus for testing gyroscopes, comprising relatively movable members, mechanism for causing relative movement of said members at a rate equal to the apparent movement in azimuth of a line moving with the earth but parallel to itself, and means whereby said members may be held otherwise fixed in azimuth, including a repeater motor adapted to be driven from a compass.

13. In a testing stand for torpedo gyroscopic units in which the gyroscope possesses a plurality of degrees of freedom and a gear secured thereto, a rotatable platform to which the gyroscopic unit is adapted to be secured, a slidable carriage mounted adjacent thereto, a locking bolt on said carriage for locking the gyroscope, a gear rotatably mounted thereon adapted to drive said first gear, and motive means connected to the second gear, whereby upon withdrawal of the carriage the gears and locking bolt will be disengaged.

14. A testing stand for torpedo gyro-units comprising a rotatable platform adapted to receive the gyro-unit, a slidable spinning up and locking mechanism mounted adjacent said platform, and adapted to be moved into and out of operative engagement with the gyro unit to spin up and release same, and means for rotating said platform at a predetermined rate after the spinning up and release of the gyro unit.

In testimony whereof I have signed my name to this specification this 4th day of October, 1915.

Dr. ELEMER MEITNER.